Aug. 17, 1965

C. B. MAY ETAL 3,201,722

TRANSMISSION LINE ADAPTER FOR CONNECTING COAXIAL
AND STRIP TRANSMISSION LINES AT RIGHT ANGLES

Filed Oct. 17, 1963

INVENTORS
CHARLES B. MAY
RICHARD D. JEFFERY

BY
*Howard J. Murray Jr.* AGENT
*George J. Rubens* ATTORNEY

Aug. 17, 1965

C. B. MAY ETAL 3,201,722

TRANSMISSION LINE ADAPTER FOR CONNECTING COAXIAL
AND STRIP TRANSMISSION LINES AT RIGHT ANGLES

Filed Oct. 17, 1963

INVENTORS
CHARLES B. MAY
RICHARD D. JEFFERY

BY *Howard J. Murray, Jr.* AGENT

*George J. Rubens*
ATTORNEY

United States Patent Office 3,201,722
Patented Aug. 17, 1965

3,201,722
TRANSMISSION LINE ADAPTER FOR CONNECTING COAXIAL AND STRIP TRANSMISSION LINES AT RIGHT ANGLES
Charles B. May and Richard D. Jeffery, Ridgecrest, Calif., assignors to the United States of America as represented by the Secretary of the Navy
Filed Oct. 17, 1963, Ser. No. 317,096
6 Claims. (Cl. 333—84)
(Granted under Title 35, U.S. Code (1952), sec. 266)

The invention described herein may be manufactured and used by or for the Government of the United States of America for governmental purposes without the payment of any royalties thereon or therefor.

The present invention relates to electrical connectors, and particularly to a unit for joining a coaxial line to a transmission line of the "strip" type.

There are numerous instances where it is desirable to electrically connect two transmission lines without introducing any appreciable change in the voltage standing wave ratio (VSWR). This is frequency difficult to accomplish, however, since any abrupt discontinuity in the physical characteristics of the assembly usually results in a change in its characteristic impedance and the consequent production of standing waves in the line. Unless such a condition is compensated for, the efficiency of the line is lowered, especially at the higher frequencies, and, in addition, considerable distortion may be introduced into any signal being transmitted.

Many devices are now known for interconnecting two transmission lines when both such lines are of the coaxial type. This does not present too many problems, inasmuch as both members are similarly made up of a rod-like inner conductor surrounded by an outer conductor of tubular configuration. However, the matter is rendered much more difficult to resolve when one of the lines to be joined differs in its overall design from the one to which it is to be connected. This is the case, for example, when one of the lines is coaxial in nature and the other is of the "strip" type, in which a flat and relatively narrow center conductor is "sandwiched" between and electrically separated from two flat and relatively wide conductors lying on either side of the center conductor. Under such circumstances, it is difficult to make a connection with a coaxial line except in a particular environment where the two members are so oriented as to be "in-line." When this condition is present, the center conductor of the strip line is receivable in a recess formed in the inner conductor of the coaxial line, while the two outer conductors of the former directly engage the terminal portion of the tubular outer conductor of the coaxial line.

However, when the connection is to be made between two lines which lie at right angles to one another, it is no longer possible to employ an "in-line" method of joining the two conductors, and, instead, it is customary to extend the inner conductor of the coaxial line into the body of the strip line to a point where it enters into electrical engagement with the strip line center conductor. An undesirable characteristic of such an expedient is that the tubular outer conductor of the coaxial line is in only partial physical engagement with the two outer conductors of the strip line, and hence a rather large discontinuity is introduced which, especially at higher frequencies, causes a severe degradation in the electrical performance of the assembly.

One object of the present invention, therefore, is to provide an improved form of electrical connector for high-frequency transmission lines having different structural characteristics.

Another object of the invention is to provide an adapter especially designed for joining a coaxial transmission line to one of the so-called "strip" type.

A further object of the invention is to provide an adapter for interconnecting different types of electrical transmission lines without producing any appreciable discontinuity therein which would have an adverse effect on the voltage standing wave ratio of the assembly.

Other objects, advantages, and novel features of the invention will become apparent from the following detailed description of the invention when considered in conjunction with the accompanying drawings wherein.

There are numerous occasions when it is desirable to electrically interconnect two transmission lines. If both such lines are of the coaxial type, little difficulty is usually experienced in effecting a connection which is of an electrically "smooth" nature and there are many devices now available in the prior art for accomplishing this objective. However, it frequently becomes necessary to join a coaxial line to one which is of the "strip" type. The latter is made up of two outer conducting strips (the ground planes) between which lies a single flat conductor separated from the respective ground planes by layers of dielectric material. Conventionally, the ground plane conducting strips are each at least several times wider than the inner conductor.

Figure 1:
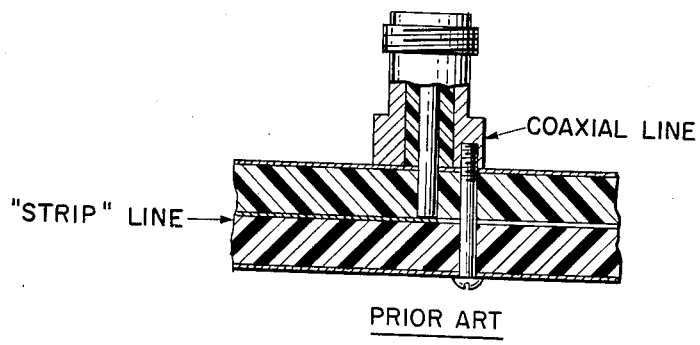
FIG. 1 is a sectional view of a 90° transmission line adapter of the type now known in the prior art.

When a line of the above type is to be connected to one of coaxial configuration, it is difficult to avoid introducing objectionable variations in the voltage standing wave ratio. This is especially true when the two lines to be connected lie at an angle to one another, since heretofore this required that the center conductor of the coaxial line be extended into the body of the strip line until it electrically engaged the inner conductor of the latter. Such an arrangement is shown in FIG. 1 of the drawing, which illustrates a typical adaptor now being employed for this purpose. It will be apparent that a rather severe electrical (as well as physical) discontinuity exists between the lower ground plane conductor of the strip line and the outer tubular conductor of the coaxial line. This raises to a considerable degree the voltage standing wave ratio of the lines. It is consequently an objective of the present invention to provide an adaptor by means of which an essentially flat voltage standing wave ratio is maintained over a relatively wide band of frequencies.

Figure 2:
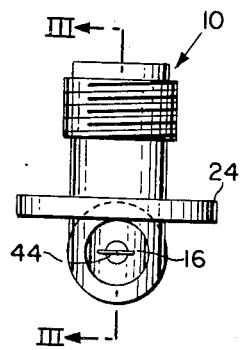
FIG. 2 is a plan view of a connector assembly designed in accordance with a preferred embodiment of the present invention.
Figure 3:
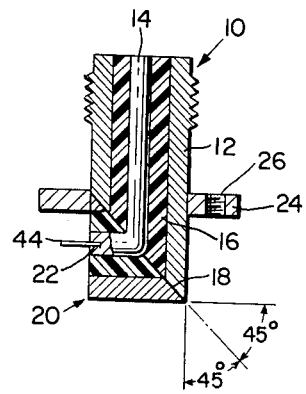
FIG. 3 is a sectional view of FIG. 2 taken along the line 3—3.
Figure 4:
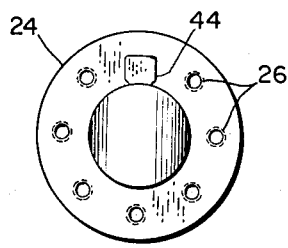
FIG. 4 is a bottom view of the connector assembly of FIG. 2.

One manner in which the above objective may be achieved is by use of the connector assembly set forth in FIGS. 2, 3 and 4 of the drawings. This assembly includes the terminal portion of a standard coaxial transmission line, generally identified by the reference numeral 10. In the usual manner, this coaxial line is made up of an outer tubular conductor 12 and an inner conductor 14 which is separated from the outer conductor 12 by an insulating member 16 of annular configuration. As best shown in FIG. 3, this coaxial line 10 is cut at an angle of 45° to its longitudinal axis along a line 18. A further coaxial line portion 20 is welded or otherwise secured to the first-mentioned section along the line 18, this further line portion also terminating in a plane which forms an angle of 45° to its longitudinal axis. Consequently, the two joined sections result in the axis of line section 20 forming an angle of 90° to the original axis of line section 10. The center conductor 14 of line 10, however, is not cut along the line 18, but instead extends outwardly therefrom and is bent at right angles so as to coincide with the axis of the line portion 20. It will be noted that the corners of the conductor 14 at the point where the latter is bent are not sharp, but instead are rounded to a slight degree. The resulting assembly is machined or otherwise rounded so that the added line section 20 is cylindrical and coextensive with the outer surface of the tubular conductor 12. In other words, the added portion 20 is conformed to the shape of the original coaxial line section. The outer extremity of the conductor 14, where it terminates as a portion of the line 20, is provided with a slot 22 the purpose of which will become apparent when the connector of FIGS. 2, 3 and 4 is described in association with a transmission line of the strip type. At this point, however, it need only be recognized that the line portion 20 is semi-cylindrical in outline (see also FIG. 2) and is intended to engage the three planar conductors of the "strip" transmission line portion with which the coaxial line 10 is to be associated.

Figure 5:
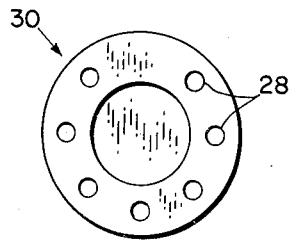
FIGS. 5 and 6 are plan and side views, respectively, of a locking member or "butt plate" to be employed in conjunction with the connector of FIG. 2.
Figure 6:
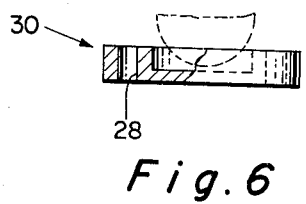

The coaxial line 10 is provided with a flanged portion 24 which extends radially therefrom and serves as one element of a clamping unit the other member of which is a so-called butt plate (shown in FIGS. 5 and 6) which unit serves to position therebetween the strip transmission line to which the coaxial line 10 is to be electrically joined. The flanged portion 24 is provided with a plurality of openings 26, as shown in FIG. 4, which are aligned with corresponding openings 28 in the butt plate 30 (FIG. 5).

Figure 7:
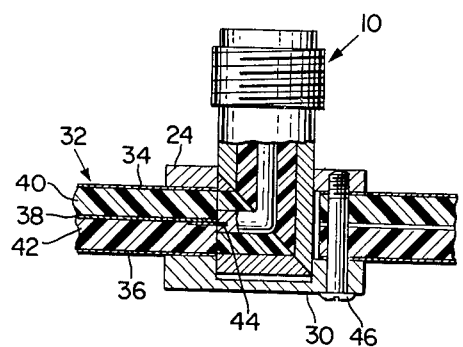
FIG. 7 is a sectional view of the connector of FIGS. 2 and 3 after such connector has been electrically joined to a transmission line of the "strip" type.

FIG. 7 illustrates the adapter of FIGS. 2, 3 and 4 after the latter has been joined electrically to a transmission line (generally identified by the reference numeral 32) of the strip type—that is, it consists of a pair of grounded conducting strips 34 and 36 between which lies an inner conductor 38 separated from the respective conducting strips 34 and 36 by a pair of insulating layers 40 and 42. All of these elements 34 through 42, while arranged in contiguous relationship when assembled in the manner shown in FIGURE 7 of the drawing, are not in any way secured to one another by any adhesive substance. Instead, they are maintained in the position illustrated in the drawing by some known form of clamping device or devices (not shown) and are readily separable by the removal of such device or devices. It might be mentioned that, as an alternative to the construction set forth above, the strip line 32 may be composed of two dielectric members each having a thin layer of electrically conductive material (such as copper) applied to each surface thereof by some method such as electrodeposition. One surface of one of the members (that surface which is to face the other member) has this coating removed, and then the two members are clamped together at several points by either bolts or plates. No adhesive whatsoever is utilized, and consequently the structure is separable by simply removing the clamping means which maintains the assembly in unitary relationship. In assembling the combination of FIG. 7, an opening is formed in the strip line, and then the conducting strip 36, together with its associated dielectric layer 42, is separated from the remainder of the strip line in the manner illustrated in FIG. 7a. This exposes the inner strip line conductor 38, as shown, the entire assembly of FIG. 7a being inverted in the drawings with respect to that of FIG. 7 in order to more clearly bring out the interrelationship of this inner strip line conductor 38 and the inner conductor 14 of the coaxial line 10.

Figure 7A:
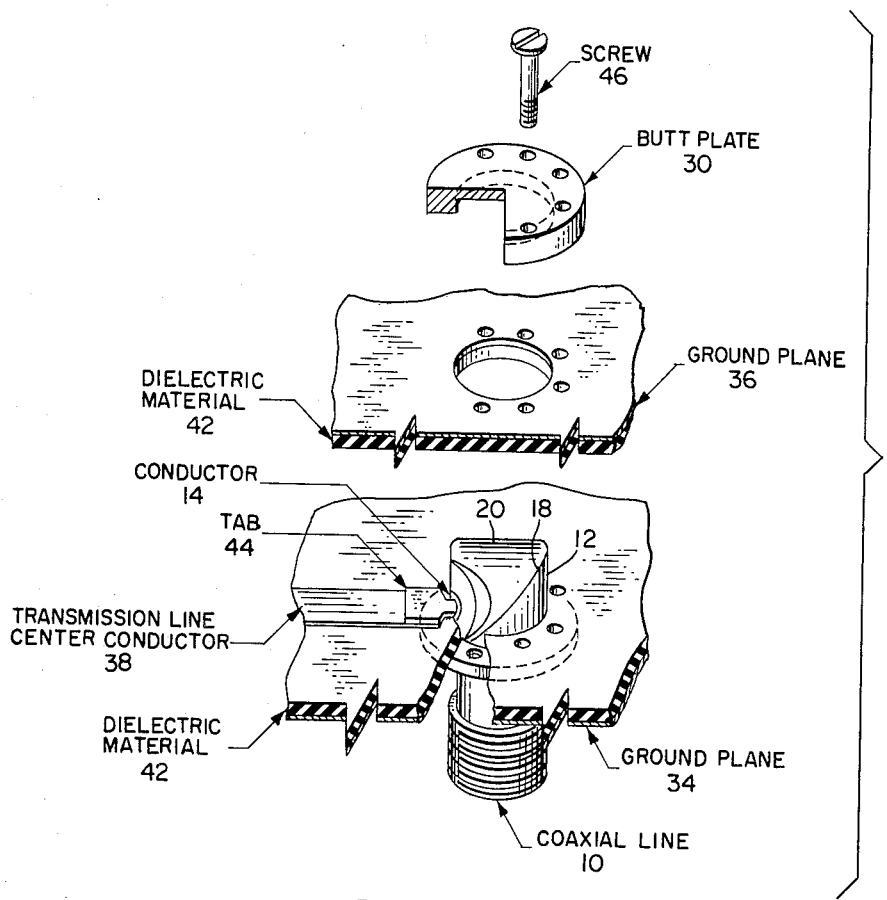
FIG. 7a is an exploded view of the components of FIG. 7 during the assembling operation, the view being inverted in position to more clearly bring out the inter-relationship of the individual elements.

The adaptor of FIGS. 2, 3 and 4 is then inserted into the opening formed in the elements 34 and 40 until the former rests upon the flanged portion 24 of the transmission line. The inner conductor 38 of the latter is now adjacent the slot 22 formed in the center conductor 14 of the coaxial line 10, and a tab 44 is inserted into this slot and welded or otherwise secured to the conductor 14. As shown in FIG. 7a, this tab 44 overlies a portion of the surface of the inner conductor 38 of the strip line.

The members 36 and 42 are then restored to their original position in the strip line "sandwich," and the butt plate 30 installed. The latter is forced toward the flange 24 by the action of bolts or screws 46 which are receivable in the openings 26 of the flange 24 (see FIG. 4) and also in the openings 28 of the butt plate (see FIGS. 5 and 6). When such screws 46 are tightened, the tab 44 is brought into close contact with the center conductor 38 of the strip line, while at the same time the outer conductor 34 of such line forcefully engages the outer tubular member 12 of the coaxial line 10. Still further, the remaining outer conductor 36 of the strip line enters into a similar close electrical engagement with a diametrically-opposed area of the same outer tubular conductor 12, and such close engagement is facilitated by the wedging or clamping action of the butt plate 30. Such action results in the entire unit of FIG. 7 being both mechanically and electrically "tight."

Figure 8:
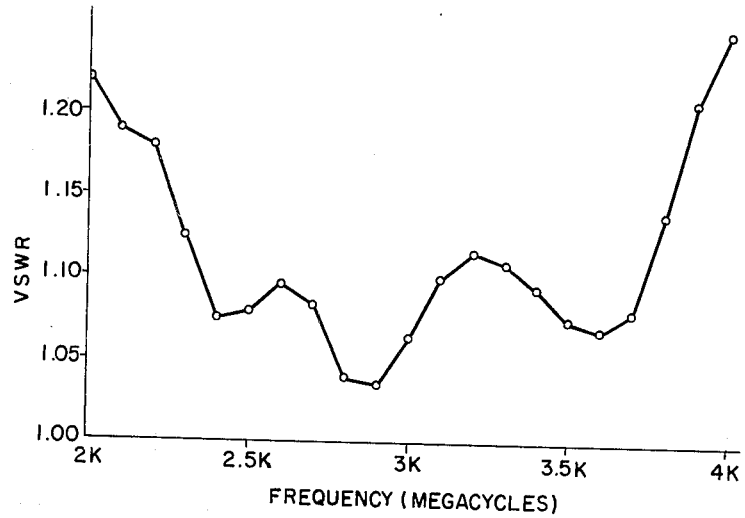
FIG. 8 is a graph showing the relationship of frequency to voltage standing wave ratio when employing a connector of the type described.

This condition is substantiated by actual measurements of the voltage standing wave ratio (VSWR) in a transmission line assembly in which the connector of the present invention has been incorporated, and FIG. 8 illustrates this ratio as plotted against the operating frequency. As brought out therein, this ratio varies only slightly as the frequency ranges from 2000 megacycles to 4000 megacycles. Such a result has heretofor been difficult to attain with prior art connectors of the type set forth in FIG. 1. It should be further noted that the relatively "flat" appearance of the graph of FIG. 8 is quite similar that which is obtained when a coaxial transmission line is joined to a strip line in *linear* fashion, without any abrupt change in direction being introduced. In other words, the present disclosure permits the efficiency of an "in-line" design to be obtained for a condition where the lines are angularly related to one another.

Obviously many modifications and variations of the present invention are possible in the light of the above teachings. It is therefore to be understood that within the scope of the appended claims the invention may be practiced otherwise than as specifically described.

We claim:

1. A connector for joining a coaxial transmission line to one of the "strip" type, said coaxial line being made up of a tubular outer conductor and an inner conductor electrically separated from the outer conductor by an annular spacer of dielectric material, said strip line being made up of a pair of planar outer conductors lying face-to-face in spaced apart parallel relationship with a center conductor also of planar configuration lying therebetween and respectively separated therefrom by two spacers of dielectric material lying to each side of the center conductor, being adapted to join said coaxial line to said strip line at any point along the latter, said strip line having formed therein an opening in the region where the connection to said coaxial line is to be effected, the dimensions of said opening being slightly greater than those of the tubular conductor of said coaxial line, the tubular outer conductor and the dielectric material of said coaxial line being cut at an angle of 45° to the longitudinal axis of the coaxial line at the extremity thereof where the connection to said strip line is to be made, the inner conductor of said coaxial line extending beyond the plane at which the outer conductor is so cut and having a relatively smooth 90° bend therein in the region where the 45° cut in said outer conductor is made, said connector including:
- a further coaxial transmission line segment of a type and with dimensions similar to that of the said transmission line, said segment having one end which terminates as the rounded surface of a cylinder the axis of which lies essentially normal to the longitudinal axis of such segment and another end which terminates in a plane which lies at an angle of 45° to such axis, said further line segment being made up solely of a tubular outer conductor and of an annular insert of dielectric material;
- means for joining said further transmission line segment to said coaxial line so that the 45° terminations of each abut one another to form in effect a 90° bend in said coaxial line, with the inner conductor of said coaxial line extending into said segment and terminating on the same rounded cylindrical surface on which the tubular outer conductor of said segment terminates;
- the combination of said coaxial line and its terminating segment being receivable in the opening formed in said strip line so that the terminal portion of the inner conductor of said coaxial line lies in essentially linear relationship with the center conductor of said strip line, and with the outer tubular conductor of said coaxial line segment contacting both of the planar outer conductors of said strip line;
- whereby the electrical characteristics of the connector are such as to maintain a substantially uninterrupted path for current flowing in either direction through said strip line and said coaxial line; and
- whereby the standing wave ratio of the assembly is maintained essentially "flat" throughout a wide range of operating frequencies.

2. A connector of the type set forth in claim 1; further comprising:
- an annular flange carried by said coaxial line in the region where it is to be joined to said strip line, said flange extending radially outwardly from said coaxial line and designed to directly engage one of the planar outer conductors of said strip line;
- a butt plate essentially similar in configuration to said flange and designed to overlie the further extremity of said coaxial line after the latter has been inserted into the opening formed in said strip line with flange of said coaxial line in position to directly contact one of the outer planar conductors of such strip line;
- said butt plate contacting the remaining outer conductor of said strip line so as in effect to "sandwich" the strip line between said flange and said butt plate; and
- a plurality of securing elements engaging both said flange and said butt plate for compressing said strip line therebetween and thereby effecting a positive electrical connection between the inner and outer conductors, respectively, of both said strip line and said coaxial line.

3. The combination of claim 1 in which the inner conductor of said coaxial line has a slot formed in the terminal portion thereof; and
- a tab of electrically-conductive material receivable in said slot and designed to enter into electrical engagement with the center conductor of said strip line when said connector is inserted into the opening formed in said strip line.

4. In combination:
- a coaxial transmission line comprising a tubular outer conductor and an inner conductor electrically separated from the outer conductor by an annular spacer of dielectric material;
- a "strip" transmission line made up of a pair of planar outer conductors lying face-to-face in spaced-apart parallel relationship, and a center conductor also of planar configuration lying therebetween and respectively separated therefrom by two spacers of dielectric material lying to each side of the center conductor;
- said strip line having an opening formed therein;
- the tubular outer conductor and the dielectric spacer of said coaxial line terminating in a plane which lies at an angle of 45° to the longitudinal axis of the coaxial line, with the center conductor of said coaxial line extending beyond the plane at which said outer conductor and said dielectric spacer terminate, said center conductor being bent in a relatively smooth manner at such plane of termination so that the axis of the outer most portion of said center conductor extends in a direction 90° removed from the axis of said coaxial transmission line;
- an adaptor comprising a segment of a coaxial line of dimensions similar to those of said coaxial transmission line, one end of said line segment terminating in a portion of the rounded surface of a cylinder the axis of which extends essentially perpendicularly to the longitudinal axis of said line segment, the other end of said line segment terminating in a plane which lies in an angle of 45° to the longitudinal axis of said line segment, said adapter having an axial opening therein which occupies the region normally occupied by a center conductor;
- means for joining said segment to said coaxial line so that the 45° termination of the former abuts the 45° termination of the latter, with the respective outer conductors of the segment and of the coaxial line being in electrical engagement and with the bent inner conductor of said coaxial line being receivable in the opening of said segment so as to extend therethrough and terminate in the said rounded cylindrical surface portion;
- whereby, when said coaxial line, to which said adapter has been added, is inserted in the opening in said strip line, the inner conductor of said coaxial line will electrically contact the center conductor of said strip line, with the tubular outer conductor of said coaxial line entering into direct electrical contact with both the planar outer conductors of said strip line so as to preclude the development of standing waves at the point of interconnection and to maintain the overall impedance characteristics of the assembly.

5. The combination of claim 4, in which the outer extremity of the center conductor of said coaxial line as it lies within said adaptor after the latter has been joined to said coaxial line is provided with a slot; and
- a tabular insert secured within said slot after the insertion of said coaxial line, with its adapter joined thereto, into the opening formed in said strip line;
- whereby, following such insertion of said adapter assembly into such opening, said tabular insert will enter into electrical engagement with the center conductor of said strip line to ensure uninterrupted electrical continuity between the respective inner conductors of said strip line and said coaxial line.

6. The combination of claim 5, in which said coaxial line is provided with a flanged extension adapted to contact one planar outer conductor of said strip line when said coaxial line, to which said adapter has been joined, is inserted into the opening in said strip line;
- a butt plate having an outer diameter substantially identical to that of said flange;
- said butt plate being adapted to lie in contiguous but non-contacting relationship with one surface of said adapter following insertion of the latter into the opening in said strip line, said butt plate also being adapted to lie in contacting relationship with another surface portion of said adapter which constitutes an extension of said coaxial transmission line, said butt plate further contacting the remaining planar outer conductor of said strip line so as in effect to "sandwich" said strip line between said flange and said butt plate;

a plurality of aligned openings formed both in said butt plate and in said flange;

and a plurality of securing means respectively receivable in said openings and acting to compress said strip line between said butt plate and said flange.

References Cited by the Examiner

UNITED STATES PATENTS

| | | | |
|---|---|---|---|
| 2,813,144 | 11/57 | Valach | 339—177 |
| 3,005,986 | 10/61 | Reed | 333—84 |
| 3,013,227 | 12/61 | Jordan | 333—84 |

OTHER REFERENCES

Gremar: Advertisement in Electronic Design of May 24, 1962, page 106.

HERMAN KARL SAALBACH, *Primary Examiner.*